Patented Aug. 30, 1938

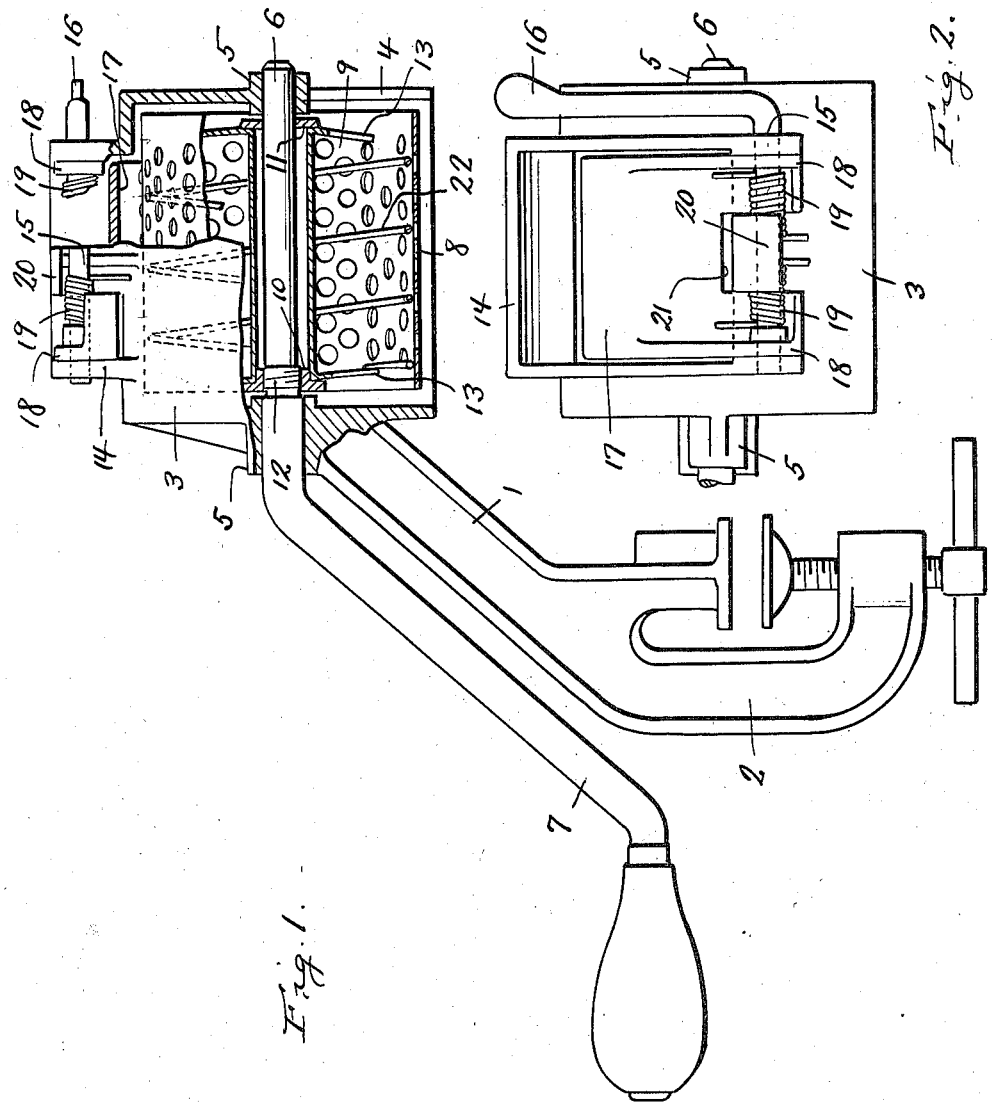

2,128,792

UNITED STATES PATENT OFFICE 2,128,792

CHEESE GRATER

Anthony Berarducci, McKeesport, Pa.

Application November 16, 1937, Serial No. 174,877

1 Claim. (Cl. 146—92)

The present invention relates to new and useful improvements in cheese graters of the portable, hand operated type and has for one of its important objects to provide, in a manner as hereinafter set forth, a device of this character embodying a feeder of a novel construction and arrangement for automatically pressing the cheese against the grater element.

Other objects of the invention are to provide a cheese grater of the aforementioned character which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a cheese grater constructed in accordance with the present invention, a portion of the device being broken away in section.

Figure 2 is a top plan view of the invention with the operating crank and supporting structure omitted.

Figure 3:
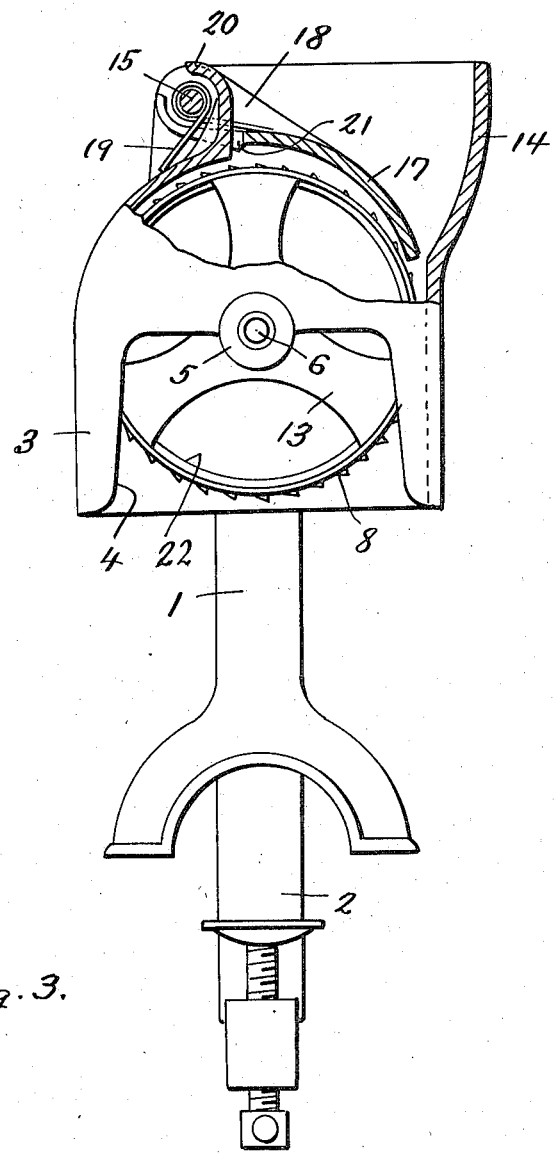
Figure 3 is a view in front elevation of the device with a portion broken away in section.

Referring now to the drawings in detail, it will be seen that the embodiment of the invention which has been illustrated comprises an inclined supporting standard 1 of any suitable metal. On the lower end of the standard 1 is a clamp 2 for detachably securing the device on a support, such as a table.

On the upper end of the supporting standard 1 is a horizontally projecting metallic housing 3 which is open at its bottom and which is also provided, in the lower portion of its forward end, with a recess or opening 4.

In the end walls of the housing 3 longitudinally aligned bearings 5 are provided and journaled therein is a shaft 6 having a hand crank 7 on one end. Fixed on the shaft 6 for rotation therewith in the housing 3 is a grating drum on cylinder 8. The drum 8 comprises a hub structure 9 in the form of a sleeve which is spaced from and secured to the shaft 6 by collars 10 and 11. The collar 10 is threaded on an enlarged portion 12 of the shaft 6. Spiders 13 mount the drum 8 on the hub structure 9.

Rising from the housing 3 and communicating therewith is a hopper 14. Journaled in certain of the walls of the hopper 14, at one side thereof, is a longitudinal shaft 15 which terminates, at one end, in a hand lever or handle 16. It will be observed that the hopper 14 is located toward one side of the vertical center of the housing 3, as best seen in Fig. 3 of the drawing. Fixed on the shaft 15 for swinging movement in a vertical plane in the hopper 14 is an arcuate feeder plate or the like 17. The feeder 17 comprises integral ears 18 which are fixed on the shaft 15. Springs 19 are mounted on the shaft 15 and engaged with the feeder 17 in a manner to yieldingly urge same downwardly in the hopper 14. A lip 20 rises from the top of the housing 3 and curves rearwardly over an intermediate portion of the shaft 15. The feeder 17 is recessed at its hinged end, as at 21, to accommodate the member 20.

It is thought that the operation of the device will be readily apparent from a consideration of the foregoing but it may be briefly stated as follows:

The device is secured on a suitable support, such as the edge of a table, through the medium of the clamp 2 and a receptacle is placed beneath the housing 3 to receive the grated cheese. The feeder 17 is then swung upwardly to raised position against the tension of the springs 19 through the medium of the hand lever 16 and the cheese is placed therebeneath in the hopper 14 on the drum 8. The drum 8 is then actuated through the medium of the crank 7 for grating the cheese in an obvious manner. The reference numeral 22 designates a coil spring which is mounted in the rotary drum 8 and which constitutes a reinforcement for said drum. The feeder 17 yieldingly presses the cheese against the grating drum 8 constantly. When desired, the shaft 6 may be unscrewed from the collar 10, withdrawn from the housing 3 and the drum 8 may then be removed. The shaft 6 slips through the collar 11 of the hub structure 9.

It is thought that the many advantages of a cheese grater constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

In a grater, a support adapted to be fixed to an edge of the table to incline upwardly and inwardly over the same, a crank operative shaft journalled in the upper end of the support to extend horizontally therefrom, a cylindrical foraminous grater fast on said shaft for rotation thereby and having an open end, a housing extending from said end of the support in enclosing relation to the grater and having an open bottom for the discharge therethrough of grated material accumulating on the outside of the grater, and an opening in one end for the discharge therethrough of grated material accumulating in the inside of the grater, said housing having a hopper at the top thereof communicating therewith for the feed of material therethrough to the grater, a downwardly tensioned hinged presser plate in said hopper and over the grater for urging material against the latter, and a coil spring fitted into said grater to rotate therewith and under such rotation thereof deflecting material in the grater to the open end thereof.

ANTHONY BERARDUCCI.